April 30, 1968 B. C. BROWN 3,381,137

FREQUENCY DIVIDER WHEREIN REGENERATIVE SWITCHING CIRCUITS PRODUCE PHASE DISPLACED PERIODIC SIGNALS

Filed Oct. 17, 1966 2 Sheets-Sheet 1

INVENTOR.
BUCK C. BROWN

BY Arnold & Roylance
ATTORNEYS

INVENTOR.
BUCK C. BROWN
BY
Arnold & Roylance
ATTORNEYS

United States Patent Office 3,381,137

Patented Apr. 30, 1968

3,381,137

FREQUENCY DIVIDER WHEREIN REGENERATIVE SWITCHING CIRCUITS PRODUCE PHASE DISPLACED PERIODIC SIGNALS

Buck C. Brown, Rockville, Md., assignor to Tracor, Inc., Austin, Tex., a corporation of Texas Filed Oct. 17, 1966, Ser. No. 587,069
8 Claims. (Cl. 307—41)

This invention relates to frequency dividers, and more specifically to apparatus for providing plural output signals bearing a fixed frequency and phase relationship to an input signal and to each other. The invention is especially directed to apparatus for providing three output signals having the desired relationship, but is not limited to that number.

The problem of producing three electrical signals separated in phase by a constant 120 electrical degrees so that they can be used as a three phase source of powei has in the past been solved primarily by rotating machinery of various kinds. Electronic circuitry, and especially solid state apparatus, has previously been eithei unsuitable for this purpose or has been overly complex.

For example, a ring counter having three stages is capable of responding to an input signal of frequency $3f$ to provide three signals each of frequency $f$ wherein the output pulses are separated by 120 degrees from each other. However, these pulses are necessarily mutually exclusive, i.e., no two output pulses can exist simultaneously due to the nature of the counter. These output pulses can be used as timing pulses to control three devices such as, for example, monostable multivibrators, to produce the desired overlapping signals but the output from the counter itself is not suitable. The addition of the multivibrator is, of course, undesirable because of expense, size and complexity, and because the termination of each signal necessarily depends upon the inherent characteristics of each multivibrator used.

It is therefore an object of the present invention to provide an apparatus for dividing the frequency of an input signal by a fixed factor $n$ and providing $n$ output signals bearing a predetermined phase relationship to each other.

Another object is to provide an apparatus capable of generating a three phase square wave signal.

Yet another object is to provide a positively switched switching circuit capable of producing three phases having a predetermined phase and frequency relationship, and in which the leading and trailing edges of each square wave are positively determined and need not depend on time constants or upon transient switching.

Briefly described, the apparatus of this invention includes three switchable circuits and a switching control circuit in which more than one of the switchable circuits can be energized, or placed in a conductive state, at any given time. The switchable circuits are connected in regenerative fashion so that the switching sequence is fixed. Each switchable circuit has two states, conductive and nonconductive, the state of each switch at a particular time being determined in part by the current available to that switch. Sufficient current is made available by the control circuit to maintain at most two switches simultaneously conductive, thereby providing output pulses which overlap in time.

In order that the manner in which the foregoing and other objects are attained in accordance with the invention can be understood in detail, a particularly advantageous embodiment thereof will be described with reference to the accompanying drawings, which form a part of this specification and wherein.

Figure 1:
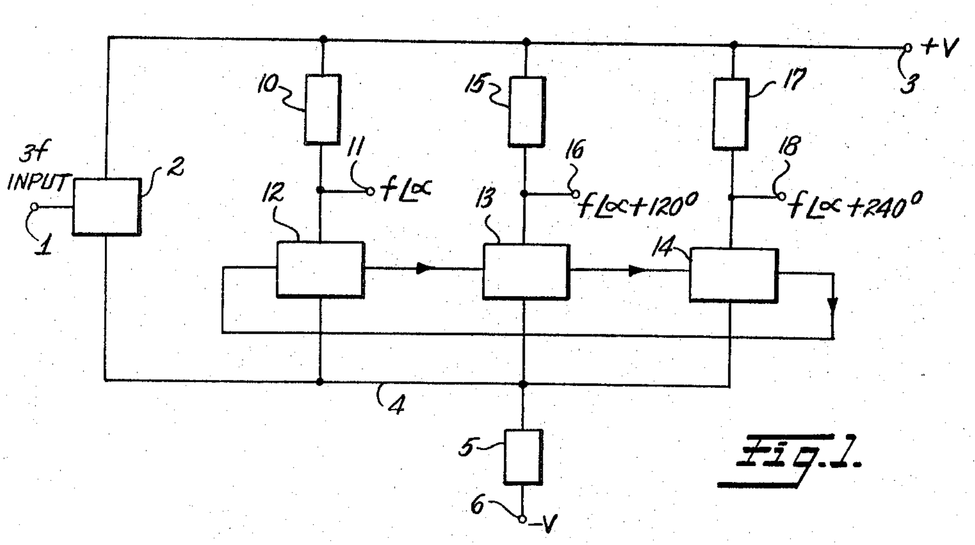
FIG. 1 is a schematic diagram in block form of the broader aspects of the invention.

FIG. 1 shows a block diagram of the system which will be helpful in explaining the basic theory and sequence of operation of the broader aspects of the invention. In FIG. 1 an input terminal 1 is connected to a current sharing switch 2 which is of a type which has a switchable conductive path and a control terminal, the conductivity of the switchable path being controllable between two substantially different levels of conductivity by a signal applied at its control terminal. One terminal of the conductive path of switch 2 is connected to a DC supply terminal 3, to which a source of positive DC voltage is connected. The other terminal of the conductive path of switch 2 is connected by a conductor 4 to one terminal of a current source resistance 5. The other terminal of resistance 5 is connected to a negative DC source terminal 6 which is connected to a negative voltage source.

One terminal of a load device 10 is connected to positive source terminal 3 and the other terminal of load 10 is connected to an output terminal 11 and to one terminal of a regenerative switch 12, the other terminal of which is connected to conductor 4. Regenerative switch 12 includes a switchable path which is connected in series circuit relationship with load 10 between conductor 4 and the positive source. Switch 12 is termed a regenerative switch because it has two states, conductive and nonconductive, and because its conductive state depends primarily upon the current available to it as determined by external circuitry. Switch 12 also has an input control terminal and an output terminal, the output terminal being connected to a similar regenerative switch 13 and the input control terminal being connected to a similar regenerative switch 14.

Switch 13 also has a switchable two-state conductive path, which is connected in series circuit relationship with a load device 15 between source terminal 3 and conductor 4 with an output terminal 16 being connected between 13 and 15. The switchable conductive path of regenerative switch 14 is connected in series circuit relationship with a load device 17 between source terminal 3 and conductor 4, an output terminal 18 being connected between devices 14 and 17.

In considering the operation of the circuit of FIG. 1, it will be observed that the system includes 4 parallel circuits, one being the switchable conductive path of current sharing switch 2 and the other three including the switchable paths of regenerative switches 12, 13 and 14, each connected in series circuit relationship with one of load devices 10, 15 and 17. It will further be observed that these four parallel circuits are all connected in series circuit relationship with current source resistance 5 between the positive and negative voltage sources. For proper operation, each of the regenerative switches 12, 13 and 14 is designed so that a predetermined amount of current must be available to it to allow it to enter and remain in a conductive state. Current sharing switch 2 is designed so that its conductive state is determined solely by the input signal applied to terminal 1. Current source resistance 5 and the magnitude of the plus and minus sources of supply are selected so that sufficient current can flow between terminals 3 and 6 to allow only two of the four parallel circuits to conduct at any given time. Thus, if switch 2 is in a conductive state, only enough current remains available to the regenerative switches to allow one of those switches to be in a conductive state, whereas if switch 2 is non-conductive two of the regenerative switches can simultaneously be conductive. Current sharing switch 2 can therefore be viewed as a diverting switch, acting in its conductive state to divert current from the regenerative switch group so that only one can remain conductive.

For purposes of this initial discussion, it can be assumed that the connections between the control terminals of regenerative switches 12, 13 and 14 do not exist. Under this assumption, it will be seen that, as current sharing switch 2 is alternatively switched from its conductive to its nonconductive state, certain ones of the regenerative switches will alternatively be turned on and off, i.e., rendered conductive and nonconductive, with two of the regenerative switches being on during the nonconductive half of each cycle of operation of switch 2 and one of the regenerative switches being on when switch 2 is conductive. No particular order can be selected under these circumstances, so the conductivity of the regenerative switches will be purely random.

As will be recognized by one skilled in the art, the signals appearing at output terminals 11, 16 and 18 will be step functions of the conductive state of the associated regenerative switches. For example, if switch 12 is nonconductive, the voltage at output terminal 11 will be substantially the same as the voltage at terminal 3 because no current flows through load device 10. When switch 12 becomes conductive, the voltage at terminal 11 drops by an amount equal to the product of the current through the regenerative switch and the magnitude of the impedance of load device 10.

Now consider the circuit of FIG. 1 with the connections between the regenerative switches restored. The connections are included to provide a preferential current path to determine a predetermined sequence of switching. Assume, for example, that switch 12 is in its nonconductive state. The connection between switch 12 and switch 13 then provides a small current to switch 13 which biases that switch to make it prefer a conductive state more than it would without that current. Assume, for example, that switch 2 is conductive and switch 12 is also conductive. A preferential current signal is then supplied to switch 13, but no such signal is supplied to switch 14. If switch 2 is then rendered nonconductive, thereby allowing two of the regenerative switches to exist in a conductive state, switch 12 will remain conductive, and because of the preferential current signal, switch 13 will assume its conductive state. Switches 13 and 14 will then both be receiving preferential current signals but switch 12 will not, so that, when switch 2 again becomes conductive, switch 12 will become nonconductive and switch 13 will be the only one of the regenerative switches in a conductive state. At the next step, switches 13 and 14 will be conductive, and the sequence will continue.

Figure 3:
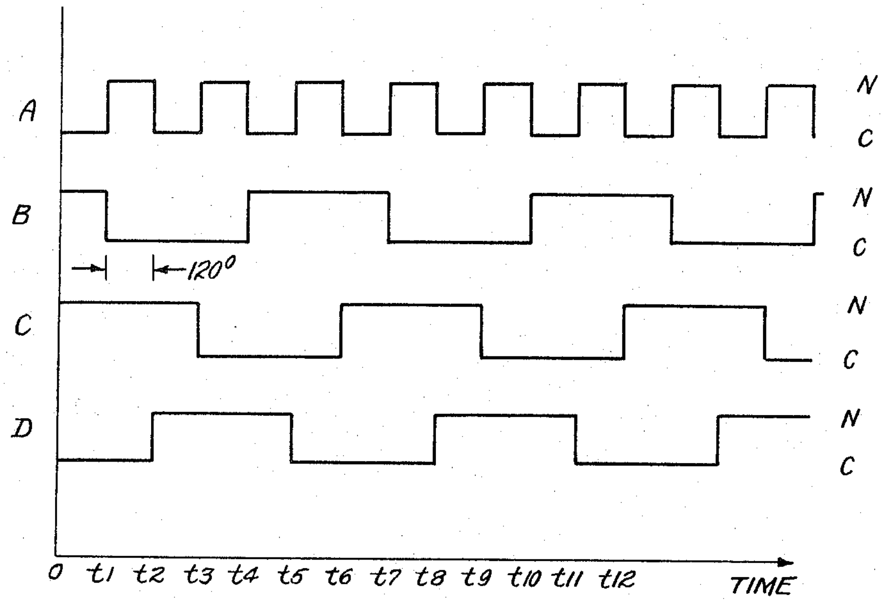
FIG. 3 is a waveform diagram showing pulses, and their time relationship, as they occur in the apparatus of FIGS. 1 and 2.

From this it will be seen that the output signals appearing at terminals 11, 16 and 18 will follow a predetermined definite sequence. This sequence will be understood more clearly by referring to FIG. 3 which shows wave forms appearing at various points in the system. Wave form A of FIG. 3 shows the signal applied at input terminal 1. Wave forms B, C and D show the wave forms appearing at output terminals 11, 16 and 18 respectively in response to state changes of the regenerative switches. The abscissa of FIG. 3 is divided in units of time, each unit being one-half cycle of the input wave form. It will be recognized that a complete cycle of operation of the system occupies six such time units, or three complete cycles of the input signal. At time zero, the input signal has dropped to zero which, it will be assumed, places switch 2 in its conductive state as shown by *c* near the right-hand end of wave form A in FIG. 3. As described above, with switch 2 in its conductive state only one of the regenerative switches can be in a conductive state, this being switch 14, thereby causing output terminal 18 to drop to its lowest voltage level as shown in wave form D. Switches 12 and 13, being nonconductive, hold terminals 11 and 16 at their highest voltage levels as shown in wave forms B and C of FIG. 3. Because switch 14 is conductive, a preferential current is supplied to switch 12.

At time $t1$, the input signal rises to its higher voltage level placing switch 2 in a nonconductive state and allowing two of the regenerative switches to become conductive. Switch 14, being already conductive, remains conductive and switch 12, being that switch which is supplied with a preferential current, enters its conductive state as shown in wave form B. Switch 13 remains nonconductive.

At time $t2$, switch 2 again becomes conductive, diminishing the available current to a level sufficient to maintain only one of the regenerative switches in a conductive state. Of the two regenerative switches which are conductive at that time, only switch 14 is not supplied with a preferential current, and is therefore the switch which enters its nonconductive state as shown in wave form D. Again, switch 13 remains nonconductive, but is now supplied with a preferential current from switch 12. At $t3$, switch 2 again becomes nonconductive, allowing switch 13 to enter its conductive state. This sequence of operation continues for as long as the voltages are supplied to terminals 3 and 6 and the input signal is supplied to terminal 1.

It will be noted that the input signal frequency is designated 3f, while the signals appearing at each of the output terminals is designated *f*, indicating that the output signals are at one-third the frequency of the input signal. It will also be noted that the time separation between the leading edges and the trailing edges of the output wave forms is equal to one-third the width of a single output pulse, this being equal to a time spacing of 120 electrical degrees.

Figure 2:
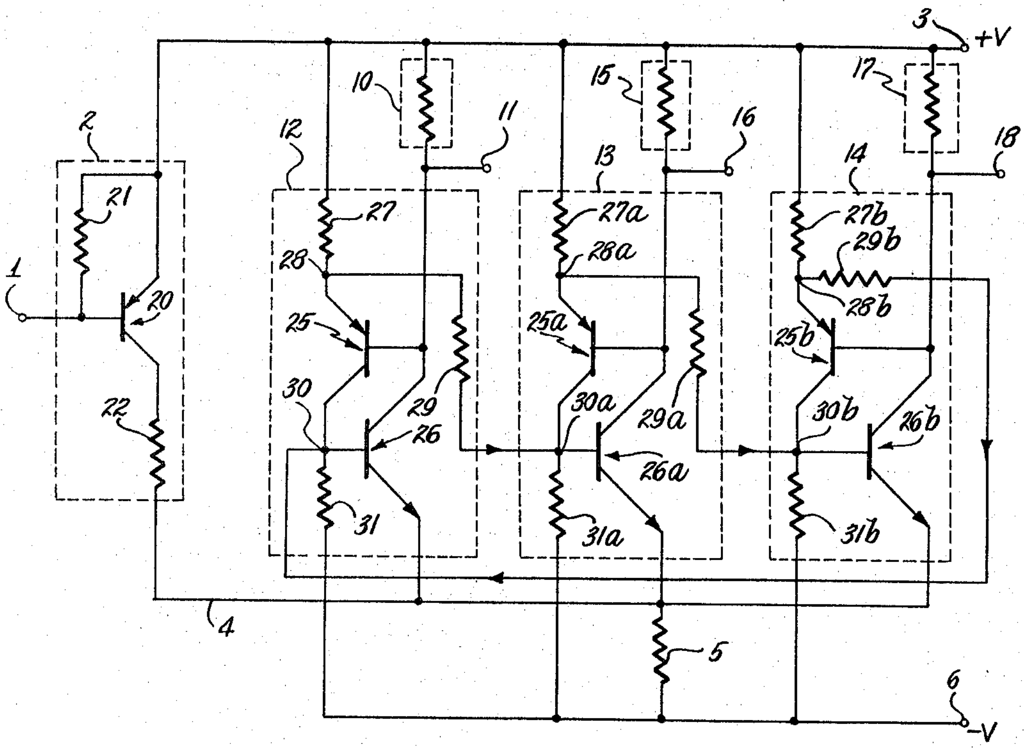
FIG. 2 is a schematic diagram showing an embodiment of the invention in detail.

FIG. 2 shows a detailed diagram of particular circuits usable in the apparatus of FIG. 1, the various elements of the two figures being identified by like numerals. In FIG. 2, current sharing switch 2 is seen to include a conventional PNP transistor indicated generally at 20. The base electrode of transistor 20 is connected to signal input terminal 1. A fixed resistor 21 is connected between the base and emitter electrodes of resistor 20, the emitter electrode being connected to positive source 3. The collector electrode of transistor 20 is connected to one terminal of a fixed resistor 22, the other terminal of which is connected via conductor 4 to resistor 5. A series circuit is thus formed between voltage supply terminals 3 and 6, including the emitter-collector circuit of transistor 20, resistor 22 and resistor 5. Thus, when transistor 20 is rendered conductive by a negative signal applied to its base electrode, the level of current flowing through the series circuit is established primarily by the resistance of resistors 22 and 5.

Regenerative switch 12 includes a conventional PNP transistor indicated generally at 25 and a conventional NPN transistor indicated generally at 26. The base electrode of resistor 25 is connected to the collector electrode transistor 26 and also to output terminal 11 and one terminal of load device 10, shown in FIG. 2 as being a fixed resistor. The other terminal of device 10 is connected to terminal 3. The emitter electrode of transistor 25 is connected to one terminal of a fixed resistor 27, the other terminal of which is connected to terminal 3. The emitter electrode of transistor 25 is also connected, at a junction 28, to one terminal of a fixed resistor 29, the other terminal of which is connected to the control input of regenerative switch 13. The connection from junction 28 through resistor 29 forms the preferential current path between switches 12 and 13.

The collector electrode of transistor 25 is connected to a junction 30 which is connected to the base electrode of transistor 26, one terminal of a fixed resistor 31 and to the preferential current connection from regenerative switch 14. The other terminal of resistor 31, a bias resistor, is connected to negative supplied terminal 6.

Figure 4:
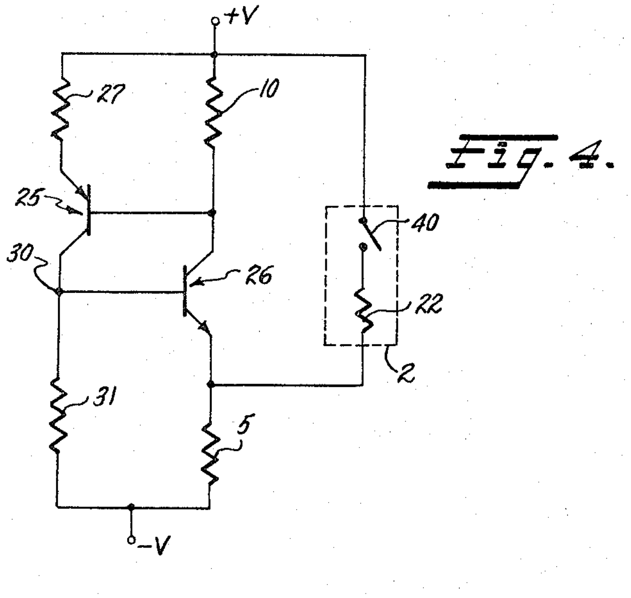
FIG. 4 is a schematic diagram of a portion of the apparatus of FIG. 2.

For purposes of explanation, regenerative switch 12 is redrawn in FIG. 4 with the preferential current circuits omitted, and with current sharing switch 2 shown as a simple signal pole-single throw switch 40. The operation of the circuit of FIG. 4 is as follows. With switch 40 open and when the supply voltages are initially connected, the emitter of transistor 26 is negative with respect to the collector. Also, resistor 31 is chosen to have a value substantially larger than the resistor 5, advantageously on a ratio of about 12:1, so that any leakage current flowing through transistors 25 and 26 tends to raise the base electrode voltage of transistor 26 higher than the emitter electrode voltage of that transistor. Transistor 26 therefore begins to conduct current. The voltage drop across resistor 10 due to this initial current causes the base electrode of transistor 25 to become more negative than its emitter electrode, causing transistor 25 to begin to conduct. As transistor 25 conducts, the voltage drop across the resistor 31 causes the base electrode of transistor 26 to become more positive, thereby increasing the conduction through transistor 26. This again increases conduction through transistor 25. The cycle continues until an equilibrium level, only limited by the current resistance, is reached, This regenerative action, which causes both transistors of the switch to become conductive with no external assistance, renders the circuit an effective regenerative switch.

Now consider the circuit of FIG. 4 with switch 40 closed. In these circumstances, it is apparent that substantial current flow through resistor 5 will cause the emitter electrode of transistor 26 to be more positive than when switch 40 is open. Transistor 26 has therefore less of a tendency to conduct current, and with sufficient current flowing through resistor 5, will conduct substantially no current, with the exception of the usual leakage. It will be remembered, however, that switch 2 in the circuit of FIG. 3 is not a simple switch such as switch 40, but is a semiconductor device the conductivity of which can be controlled and that in addition a resistor 22 is connected in series with transistor 20. Thus, with the adjustment of the values of resistor 22 and resistor 5, a point can be reached at which the circuit of FIG. 4 will conduct when switch 2 is in a conductive state, but at which any significant increase of current through resistor 5 above that produced by switch 2 alone will prevent the regenerative switch from entering a conductive state. Thus, in the circuit of FIG. 2, the resistor values are selected so that only one of the regenerative switches can conduct when switch 2 is in its conductive state.

Now consider regenerative switch 12 of FIG. 2 with the preferential current connections as shown in that figure. The regenerative switches 13 and 14, being identified to switch 12, need not be described. The various components in those switches have been designated by the same identifying numerals as those used with switch 12 with the addition of the letter *a* for the components of switch 13 and the letter *b* for the components of switch 14. It will be recognized that resistors 27*b*, 29*b* and 31 constitute a voltage divider circuit between terminals 3 and 6. When switch 14 is in a nonconductive state, the potential at junction 28*b* is therefore established by the potential difference between the supply terminals and by the relative values of the resistors in the divider. However, when switch 14 is in a conductive state, the emitter-collector current through resistor 27*b* lowers the voltage level of junction 28*b*. The voltage level at junction 30 is likewise lowered, thereby lowering the collector potential of transistor 25 relative to its emitter and base. Transistor 25 is therefore brought closer to a conductive state so that switch 12, in effect, "prefers" to enter a conductive state more than switch 13. Thus, when the condition of switch 2 is proper as previously described, switch 12 will enter the conductive state more readily than switch 13.

In the following table is given a set of resistance values which have been found to be usable in the system of FIG. 2. It will be noted that values are not given for components of regenerative switches 13 and 14, these being the same for switch 12.

*Table 1*

| | Ohms |
|---|---|
| Resistor 21 | 1,000 |
| Resistor 22 | 1,000 |
| Resistor 10 | 4,700 |
| Resistor 27 | 4,700 |
| Resistor 29 | 4,700 |
| Resistor 31 | 12,000 |
| Resistor 5 | 1,000 |
| Resistor 15 | 4,700 |
| Resistor 17 | 4,700 |

While an advantageous embodiment has been chosen to illustrate the invention, it will be understood by those skilled in the art that various changes and modifications can be made therein without departing from the scope of the invention as defined in the appended claims.

What is claimed is:

1. A pulse generating apparatus comprising the combination of
   - a DC input terminal connectable to a source of direct current;
   - a current source resistance;
   - a plurality of switching circuits each having a conductive state and a nonconductive state,
     - said switching circuits each being connected in series circuit relationship with said current source resistance between said DC input terminal and a point of reference potential,
     - the state of each of said switching circuits being dependent upon the voltage across said current source resistance, each said switching circuit being capable of entering its conductive state when the voltage across said current source resistance is below a preselected level; and
   - a current sharing switch means for initiating changes in state of said switching circuits,
     - said current sharing switch means having a control signal input terminal to which a pulsating input signal can be applied, and a switchable conductive path, said path being connected in series circuit relationship with said current source resistance;
   - said current sharing switch means and each of said switching circuits having sufficient resistance to increase the voltage across said current source resistance to said preselected level when any two thereof are in a conductive state.

2. Apparatus according to claim 1 and further comprising
   - a plurality of load devices, each of said load devices being connected in series circuit relationship with a different one of said switching circuits; and
   - a plurality of output terminals, each connected to one of said load devices.

3. Apparatus according to claim 2 and further comprising
   - a plurality of circuit means each interconnecting one of said switching circuits and another of said switching circuits for providing a preferential current to said other switching circuits when said one switching circuit is in a conductive state to establish a predetermined sequence of state changes.

4. Apparatus according to claim 1 and further comprising
   - a plurality of circuit means each interconnecting one of said switching circuits and another of said switching circuits for providing a preferential current to said other switching circuits when said one switching circuit is in a conductive state to establish a predetermined sequence of state changes.

5. Apparatus according to claim 1 wherein said current sharing switch means comprises
- a transistor having a base electrode, an emitter electrode and a collector electrode, said base electrode being connected to said control signal input terminal,
  - the collector-emitter circuit of said transistor being said switchable conductive path;
- a first resistor connector between said base and emitter electrode; and
- a second resistor connected in series circuit relationship with said emitter-collector circuit between said transistor and said current source resistance.

6. Apparatus according to claim 1 wherein each said switching circuit comprises
- a first transistor of one conductivity type having an emitter electrode, a base electrode and a collector electrode;
- a second transistor of the other conductivity type having an emitter electrode, a base electrode and a collector electrode,
  - said base and collector electrodes of said second transistor being connected to said collector and base electrodes of said first transistor, respectively;
- first and second resistors connected in series circuit relationship with the emitter-collector circuit of said first transistor between a source of DC voltage and a point of reference potential, said transistor being connected between said resistors;
- third and fourth resistors connected in series circuit relationship with the emitter-collector circuit of said second transistor between the source of DC voltage and a point of reference potential, said transistor being connecting between said third and fourth resistors; and
  - a signal input terminal connected to the junction between said second transistor and said fourth transistor,
  - said transistors both normally being in a conductive state when the circuit is supplied with DC voltage and said transistors both being rendered nonconductive by application of a voltage of predetermined amplitude at said signal input terminal.

7. Apparatus comprising the combination of
- a plurality of load devices;
- first, second and third regenerative switching means each connected to one of said load devices, for controlling the flow of current through one of said load devices;
  - each of said switching means having an input terminal and a switchable path, said load devices being connected in series circuit relationship with said switchable path,
  - each said switching means having a first state in which said switchable path freely conducts current and a second state in which said path conducts substantially no current;
- a resistor connected in series circuit relationship with said first, second and third regenerative switching means;
- fourth switching means for controlling the switching rate of said first, second and third switching means,
  - said fourth switching means having a control terminal to which a pulsating electrical signal can be applied and a switchable conductivity path,
  - said switchable path of said fourth switching means being connected in series circuit relationship with said resistor, the current flow through said resistor from said fourth switching means being sufficient to render all but one of said first, second and third switching means nonconductive; and
- circuit means interconnecting said first, second and third switching means to define a predetermined switching sequence.

8. A two state regenerative switching circuit comprising the combination of
- a first transistor of one conductivity type having an emitter electrode, a base electrode and a collector electrode;
- a second transistor of the other conductivity type having an emitter electrode, a base electrode and a collector electrode,
  - said base and collector electrodes of said second transistor being connected to said collector and base electrodes of said first transistor, respectively;
- first and second resistors connected in series circuit relationship with the emitter-collector circuit of said first transistor between a source of DC voltage and a point of reference potential, said transistor being connected between said resistors;
- third and fourth resistors connected in series circuit relationship with the emitter-collector circuit of said second transistor between the source of DC voltage and a point of reference potential, said transistor being connected between said third and fourth resistors; and
- a signal input terminal connected to the junction between said second transistor and said fourth transistor,
- said transistors both normally being in a conductive state when the circuit is supplied with DC voltage and said transistors both being rendered nonconductive by application of a voltage of predetermined amplitude at said signal input terminal.

References Cited

UNITED STATES PATENTS

| | | | |
|---|---|---|---|
| 3,099,962 | 8/1963 | Smith | 307—41 X |
| 3,260,858 | 7/1966 | Kueber | 307—88.5 |
| 3,271,655 | 9/1966 | Salowe et al. | 321—7 |
| 3,311,757 | 3/1967 | Matsumoto | 307—88.5 |
| 3,344,326 | 9/1967 | Risberg | 321—5 X |

JOHN F. COUCH, *Primary Examiner.*

WARREN E. RAY, *Examiner.*

G. GOLDBERG, *Assistant Examiner.*